UNITED STATES PATENT OFFICE.

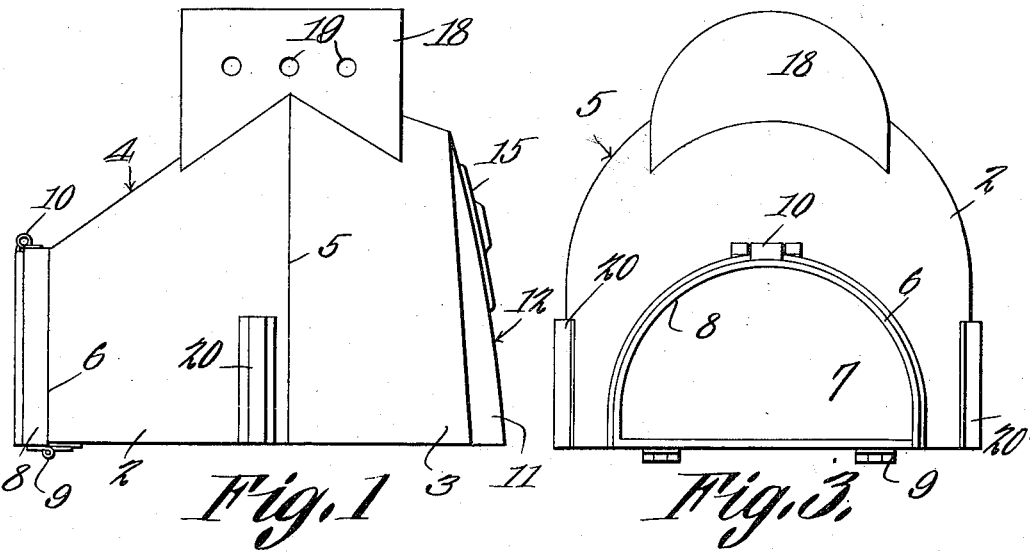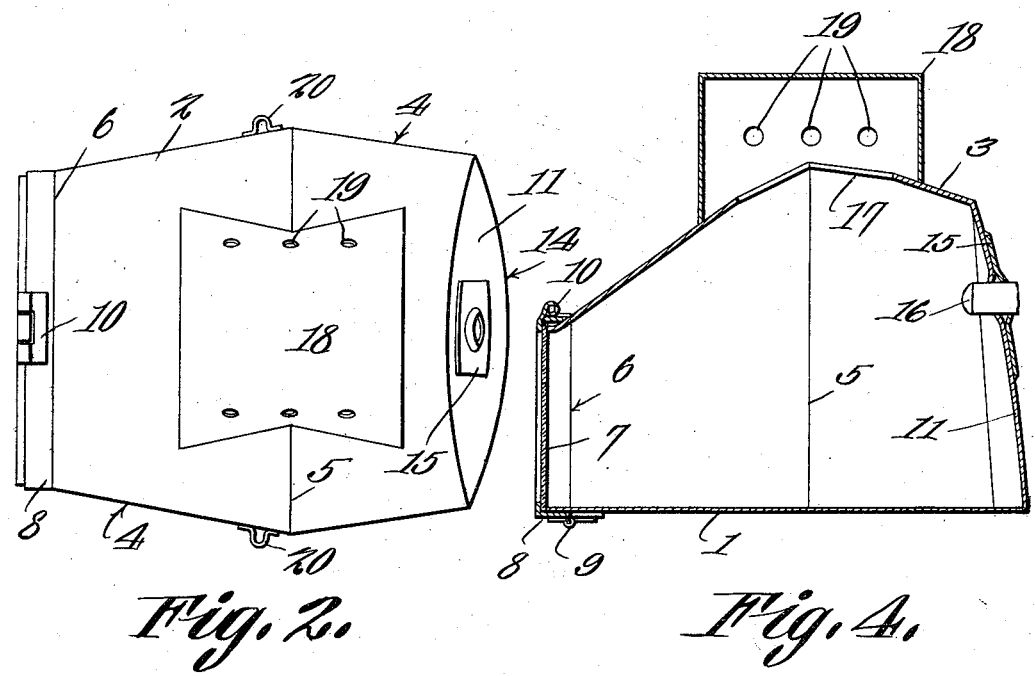

FRANCIS F. GROVE, OF GRANTS PASS, OREGON.

VEHICLE-LAMP.

1,179,626.  Specification of Letters Patent.  Patented Apr. 18, 1916.

Application filed July 31, 1915. Serial No. 43,021.

*To all whom it may concern:*

Be it known that I, FRANCIS F. GROVE, a citizen of the United States, residing at Grants Pass, in the county of Josephine and State of Oregon, have invented a new and useful Vehicle-Lamp, of which the following is a specification.

The device forming the subject matter of this application is adapted to be employed in connection with automobiles, cars and other vehicles.

The invention aims to provide a lamp of the type described which will throw a solid beam of light straight ahead, the beam of light being of restricted cross section, a glare being avoided, the object of the invention being to provide a lamp which will afford adequate illumination without dazzling pedestrians or occupants of approaching vehicles.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawing:—Figure 1 shows the invention in side elevation; Fig. 2 is a top plan; Fig. 3 is a front end elevation; Fig. 4 is a vertical longitudinal section.

The lamp forming the subject matter of this application preferably is fashioned from metal throughout and comprises a platform 1 with which is assembled a pair of transversely arched casing members 2 and 3 which taper as shown at 4 in opposite directions from a line of juncture 5. The smaller end 6 of the casing member 2 is open for the passage of light, but may be bridged across by a transparent plate 7 carried by a frame 8 hinged as shown at 9 to the bottom 1 and retained in a closed position by means of a latch mechanism 10 of any desired sort coöperating with the forward end of the casing member 2. The smaller end of the casing member 3 is closed by a back 11 which, as shown at 12 slants downwardly and rearwardly, the back 11 being curved transversely as shown at 14. The back 11 is of greater area than the light emitting end 6 of the casing member 2.

The inner face of the back 11 and the inner faces of the casing members 2 and 3 are reflecting surfaces. The upper surface of the bottom 1 preferably is not a reflector. A reinforcing plate 15 may be secured to the back 11, and through the reinforcing plate and the back is fashioned an opening through which may be inserted a burner 16 of any desired form. When the burner 16 employs a combustible fuel, an opening 17 may be fashioned in the top of the casing 2—3, the opening being surrounded by a hood 18 having ventilating apertures 19. The casing 2—3 may carry sockets 20 or other suitable elements, whereby the casing may be mounted on a vehicle.

Owing to the specific shape of the casing members 2 and 3, in combination with the flat bottom 1 and the rearwardly slanting, transversely arched back 11, the light emitted from the lamp will be prevented from passing upwardly, the light being projected downwardly and along intersecting lines, forming a compact beam giving sufficient and adequate illumination without producing a dazzling effect.

Having thus described the invention, what is claimed is:—

A lamp housing comprising a flat bottom; a pair of arched casing members assembled with the bottom and tapered in opposite directions from a line of juncture, the smaller end of one casing member being open for the passage of light; a back constituting a closure for the smaller end of the other casing member, the back being forwardly inclined to overhang the bottom and being curved transversely, the back being of greater area than the light emitting end of the first specified casing member, the inner surfaces of the back and the casing members forming reflectors.

In testimony that I claim the foregoing as my own, I have hereto affixed my signature in the presence of two witnesses.

FRANCIS F. GROVE.

Witnesses:
J. E. WEIDMAN,
E. L. COBURN.